Aug. 5, 1969     H. VERDIER     3,459,252

RIM FOR VEHICLE WHEELS

Filed May 26, 1967

*INVENTOR.*
HENRI VERDIER
BY
his     *ATTORNEYS.*

United States Patent Office 3,459,252
Patented Aug. 5, 1969

3,459,252
RIM FOR VEHICLE WHEELS
Henri Verdier, Beauregard-L'Eveque, France, assignor to Compagnie Generale des Etablissements Michelin, raison sociale Michelin & Cie, Clermont-Ferrand, Puy-de-Dome, France
Filed May 26, 1967, Ser. No. 641,674
Claims priority, application France, May 27, 1966, 63,435
Int. Cl. B60c 7/24
U.S. Cl. 152—410                    6 Claims

ABSTRACT OF THE DISCLOSURE

The invention disclosed herein relates to wheel rims in which respective angular displacement of the pieces forming the rim is prevented by equipping the axially movable ring forming the seat of the bead and the split locking ring with means which engage and resist torque applied to the axially movable bead seat ring tending to rotate it with respect to the rim base.

---

This invention relates to rims of vehicle wheels to be equipped with pneumatic tires, and, more particularly, to rims of wheels designed to accommodate large-size tires in which the tire pressure is low with respect to the driving or braking torque to which the wheel is subjected.

Wheel rims designed to accommodate large-size tires generally comprise a rim base, two rim flanges, a locking ring, a conical bead seat ring and a sealing gasket assembled together with as little clearance between the components as possible. Naturally, it is desirable that these components forming the rim do not rotate with respect to one another due to the driving torque or braking torque exerted on the wheel.

Angular displacement of the parts of the rim, and especially of the rim base and the bead seat ring is prevented when the tire pressure is sufficiently high in relation to the driving or braking torque to which the wheel is subjected. In such a case the pressure in the tire acts against the metal parts of the rim and creates thereby a frictional force which tends to immobilize the components with respect to one another. However, if the pressure in the tire is low with respect to the torque exerted, relative rotation may occur inasmuch as the frictional forces diminish in proportion to the pressure in the tire. It has long been known in the tire art that this phenomena occurs in practice particularly in the wheels of vehicles designed for heavy duty purposes, such as road building, off highway use and the like.

In accordance with the present invention, the typical wheel rim is provided comprising a rim base equipped at its one edge with a groove which receives a split locking ring, and removable ring forming the seat for the bead and having at its outer edge a flange forming a retainer for the rim flange. The locking ring and the flange of the bead seat ring are each equipped with at least one key, or lug, with the key on the locking ring being complementary in form to the corresponding key on the flange of the movable ring. The complementary surfaces of the corresponding keys form an acute angle of inclination in relation to the radial direction of the wheel rim and converge towards the outside and not toward the axis of the rim. The acute angle of inclination formed by the complementary surfaces of the set of keys ranges from 60° to 80° and preferably is approximately 70°. If a force acts on the movable ring causing it to turn with respect to the rim base, the complementary surfaces of the keys engage and the frictional engagement between the locking ring and the rim base aids in preventing rotation of the bead seat ring.

If only one set of keys is provided, relative angular displacement of the rim base and the movable ring is prevented in only one direction of rotation. Consequently, in the preferred embodiment of the invention, two sets of keys are provided, the complementary surfaces of the two sets of keys being inclined in opposite directions and converging towards the outside of the rim. The two sets of keys are preferably placed in the immediate vicinity of the gap in the split locking ring, one set of keys being located on each side of this gap.

The preferred embodiment of the invention also includes a stop key located in the groove of the rim base between the ends of the split locking ring, the length of this key being slightly less than the gap between the ends of the ring when the ring is in the groove in the rim base. This stop key acts to supplement the effect exercised by the locking ring by preventing rotation when one of the ends of the ring comes into contact with the stop key. The small section available in the groove, however, does not enable a large strong key to be provided or the use of high tensile strength steel for the reason that the steel must be weldable. Accordingly, the key merely aids in retraining the locking ring against rotation relative to the rim.

Under the effect of a torque tending to cause the axially movable ring carrying the bead to turn on the rim base, the keys with oblique surfaces act so as to compress the locking ring in the ring groove and to increase the frictional forces resisting rotation. The presence of a fixed stop in the lockring housing which enters the split of the ring, completes the locking.

For a better understanding of the invention, reference may be had to the accompanying drawings in which—

Figure 1:
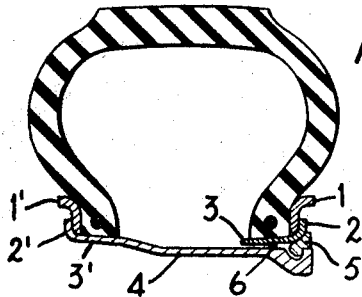
FIG. 1 is an axial cross-section of a typical wheel rim embodying the present invention on which the tire cover is sketched.
Figure 2:
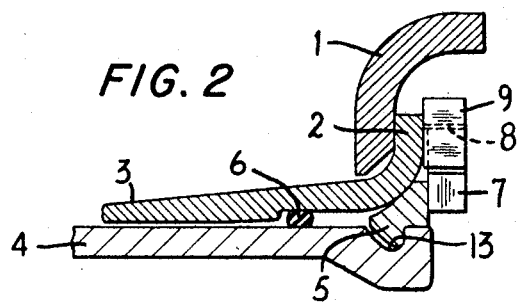
FIG. 2 is a partial cross-section of the removable side of the rim shown in FIG. 1.

As illustrated in FIG. 1, a typical wheel rim with a removable flange includes two rim flanges 1 and 1' mounted on respectively, the edge 2 of the conical bead seat ring 3 and the edge 2' of the conical bead seat 3' of the rim base 4. The rim flanges preferably are welded or otherwise secured in gas tight relation to the rim base and the bead seat ring. The removable bead seat ring 3 is fixed in position axially by a detachable split lockring 5 which is received in an annular groove 13 in the edge of the rim base 4. Between the conical ring 3 and the rim base 4 one or several sealing rings or gaskets 6 may be provided in case a tubeless tire is used.

Figure 3:
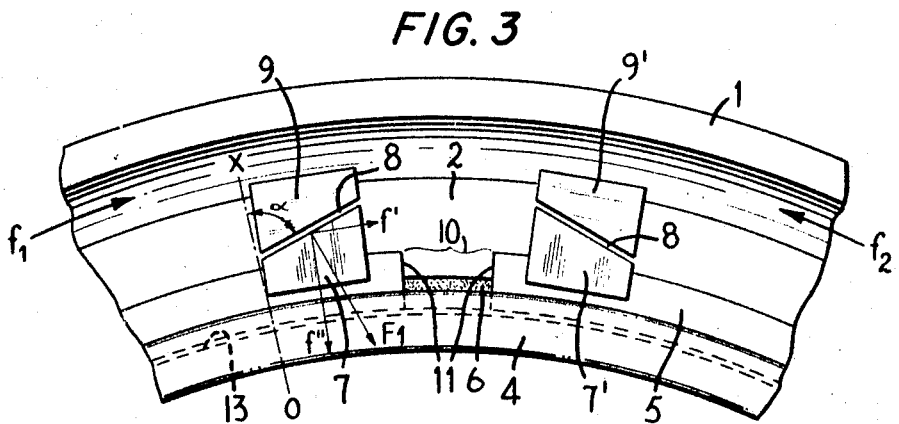
FIG. 3 is a vertical-sectional view of the removable side of the rim shown in FIG. 1.

As shown in FIG. 3, keys 7 and 7' are welded on the lockring 5, and keys 9 and 9' are welded on the edge 2 of the ring 3. The keys 9 and 7 and the keys 9' and 7' have complementary surfaces 8 and 8', respectively. The surfaces 8 and 8' converge towards the outside and not toward the axis of the rim at an acute angle of approximately 70° with the radial direction O–X. Variation of the angle of inclination of the surfaces 8 and 8' between 60° and 80° is possible, but if the angle is made too small, the effect of the radial compression of lockring against the rim base is reduced. If the angle of inclination is too large, it creates the danger of subjecting the rim to local strains which are too high.

The two keys 7 and 7', are preferably placed in the immediate vicinity of the gap 10 of the lockring 5 between the ends 11 of the ring and on either side of the gap. It has been found through experience, that a key placed diametrically opposite the gap may dislodge the ends 11 of the locking 5 from the groove 13. The self-locking or staying effect of the lockring with regard to the rim base 4 is at its maximum when the key is located closely adjacent to the gap.

Figure 4:
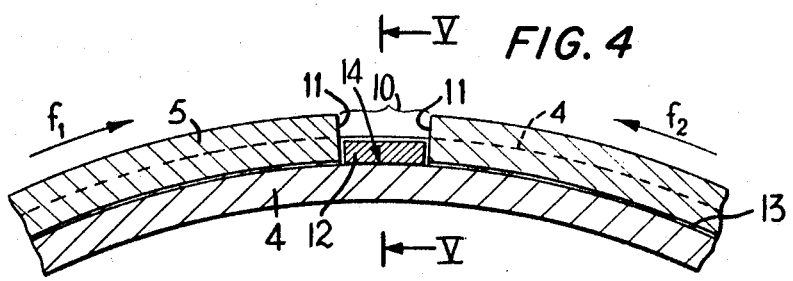
FIG. 4 is a vertical-sectional view taken along line 4—4 of FIG. 5.
Figure 5:
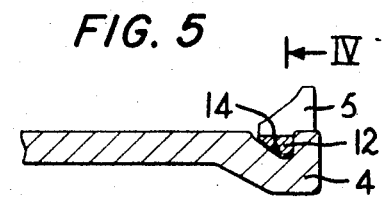
FIG. 5 is a vertical-sectional view taken along line 5—5 of FIG. 4.

As shown in FIGS. 4 and 5, a key 12 is welded or soldered on the bottom of the rim base 4. It is slightly shorter than the space between the ends 11 of the gap 10 of the lockring 5 when the ring is in position in the groove 13 in the rim base 4. In order not to form an obstacle when the ring and tire are mounted, key 12 is recessed in the surface 14 of the rim base 4.

If a force acts on the ring 3 causing it to rotate with respect to the rim base 4 in the direction indicated by the arrow $f1$, the surfaces 8 of keys 7 and 9 engage. A force F1 perpendicular to these surfaces exerts itself at the point of contact between the surfaces 8 which is resolved into a tangential force $f'$ tending to cause the lockring 5 to turn and a radial force $f''$ tending to press the ring against the rim base 4. As the driving torque or braking torque increases, the lockring presses more tightly against the rim base, and due to increased friction in direct proportion, resists more strongly forces tending to rotate the ring 5 with respect to the rim base 4. The stop key 12, further more, acts as a supplementary means to prevent angular rotation between the rim base 4 and the lockring 5 when an end 11 of the ring comes into contact with it.

Preferably, a slight radial clearance is provided between the keys 7 to 9 and 7' and 9' so that the rings 9 and 9' can position themselves when the tire is inflated without the lockring being compressed radially.

It will be obvious to those skilled in the art that various modifications can be made to the rim without departing from the scope of the present invention. For example, the surfaces 8 and 8' could be other than plane, or they could have several slopes; the keys 9 and 9' can be part of a single piece, or be connected at their closest and/or furthest surfaces in the direction of the circumference of the rim; or the keys 7 and 7' could be welded to the ends 11 of the lockring 5. The present invention, therefore, is not to be considered limited except as defined in the appended claims.

I claim:

1. A wheel rim comprising a rim base having a groove in one free edge, a split lockring mounted in said groove, an axially and rotatably movable bead seat ring retained on said rim base by said lockring and means on said axially movable ring and said lockring movable into engagement for resisting rotation of said bead seat ring when a force is applied to said bead seat ring tending to rotate said bead seat ring with respect to said rim base, said means including a key on each of said bead seat ring and said lockring, said key on said bead seat ring and said key on said lockring having complementary surfaces which are inclined obliquely with respect to the radial direction of said wheel rim at an angle between about 60° and 80°.

2. A wheel rim as defined in claim 1 wherein the angle of inclination of said complementary surfaces of said keys on said bead seat ring and said lockring is approximately 70°.

3. A wheel rim comprising a rim base having a groove in one free edge, a split lockring mounted in said groove, an axially and rotatably movable bead seat ring retained on said rim base by said lockring and means on said axially movable ring and said lockring movable into engagement for resisting rotation of said bead seat ring when a force is applied to said bead seat ring tending to rotate said bead seat ring with respect to said rim base, said means including two sets of keys having complementary surfaces which are inclined oppositely and converge outwardly with respect to said wheel rim.

4. A wheel rim as defined in claim 3 in which the keys on said lockring are fixed to said lockring adjacent to the ends thereof.

5. A wheel rim as defined in claim 3 comprising a key fixed in said groove of said rim base and disposed between the free ends of said split lockring, said key being recessed with respect to the radially outer surface of said rim base.

6. A wheel rim comprising a rim base having a groove in one free edge, a split lockring mounted in said groove, an axially and rotatably movable bead seat ring axially retained in said rim base by said lockring and at least one slanted key on each of said axially movable ring and said lockring, said slanted keys engaging each other so that, when a force is applied to said bead seat ring tending to rotate said bead seat ring with respect to said rim base, said bead seat ring presses said lockring radially inwardly against said groove through a tighter engagement of said slanted keys one with the other.

References Cited

UNITED STATES PATENTS

| | | | |
|---|---|---|---|
| 944,351 | 12/1909 | Alderfer | 152—410 X |
| 3,224,484 | 12/1965 | Smith | 152—410 |

ARTHUR L. LA POINT, Primary Examiner

PO-1050
(5/69)

UNITED STATES PATENT OFFICE
CERTIFICATE OF CORRECTION

Patent No. 3,459,252            Dated August 5, 1969

Inventor(s)    Henri Verdier

It is certified that error appears in the above-identified patent and that said Letters Patent are hereby corrected as shown below:

Col. 2, lines 24--25, "re-training" should be -- restraining --. See application page 3, line 29.

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents